W. H. SLITER.
ADVERTISING DISPLAY DEVICE.
APPLICATION FILED DEC. 14, 1917.

1,289,286.

Patented Dec. 31, 1918.
2 SHEETS—SHEET 1.

INVENTOR.
William H. Sliter
BY
ATTORNEY

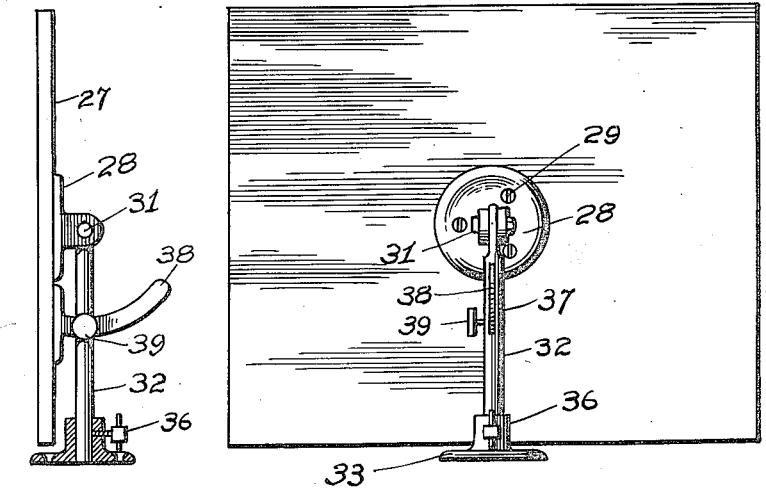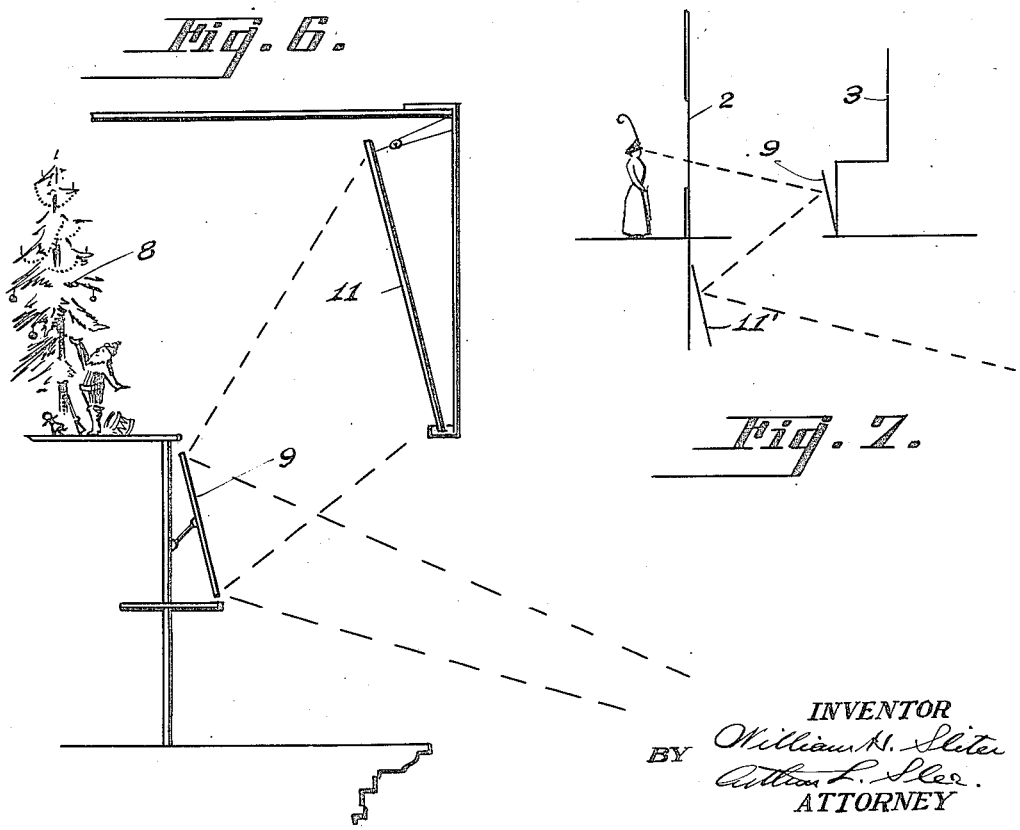

UNITED STATES PATENT OFFICE.

WILLIAM H. SLITER, OF SAN FRANCISCO, CALIFORNIA.

ADVERTISING DISPLAY DEVICE.

1,289,286.   Specification of Letters Patent.   Patented Dec. 31, 1918.

Application filed December 14, 1917. Serial No. 207,636.

*To all whom it may concern:*

Be it known that I, WILLIAM H. SLITER, a citizen of the United States, residing in the city and county of San Francisco and State of California, have invented a new and useful Improvement in Advertising Display Devices, of which the following is a specification.

This invention relates to an improved device for displaying purposes wherein reflecting elements operate to reproduce a distant animated demonstration within a display window or the like too small or shallow for such animated demonstration as enacted by adult actors or demonstrators.

In displaying and introducing the utility and appearance of new and attractive goods such space as may be available and convenient to public view is not always sufficiently large to accommodate or permit an animated demonstration.

In the present invention a shallow display window may be used for the display of new and attractive articles and a miniature animated demonstration of the utility and appearance of said articles may be projected, by means of reflecting elements arranged at proper angles, to a point above and at one side of the display of goods being demonstrated, said demonstration taking place at a point remote from the display window where a greater amount of room is available.

The invention may also be used for displaying valuable works of art, such as pictures and statuary, while keeping the object remote and inaccessible from the public thereby protecting such object from theft or damage.

By means of the improved device then remote and otherwise inconspicuous spaces, not particularly adaptable for display or other purposes, such as a mezzanine floor or balcony, may be utilized for the demonstration of the goods on display and such demonstration reflected to a point adjacent to the display.

I accomplish these several features by means of the device disclosed in the drawings forming a part of the present specification, wherein like characters of reference are used to designate similar parts throughout the said specification and drawings, and in which—

Fig. 4 is a side elevation of one form of device by means of which the reflecting elements may be adjusted;

Fig. 5 is a rear elevation of Fig. 4;

Fig. 6 is a diagrammatic view of means for displaying a setting on the roof of a building or other structure, such as the top of a high bill board; and Fig. 7 is a diagrammatic view wherein the arrangement is similar to that of Fig. 3 except that the demonstration is acted in the basement of the store when no balcony or mezzanine is available.

Figure 1:
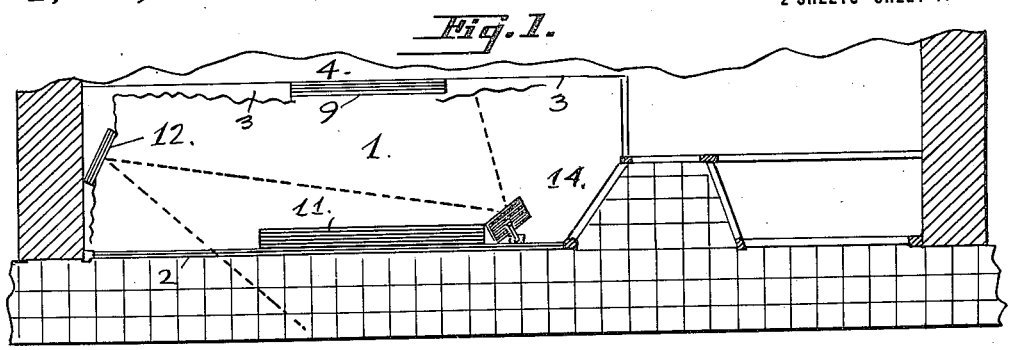
Figure 1 is a horizontal sectional view through a store front disclosing a comparatively shallow display window and the manner of mounting the reflecting elements therein.
Figure 2:
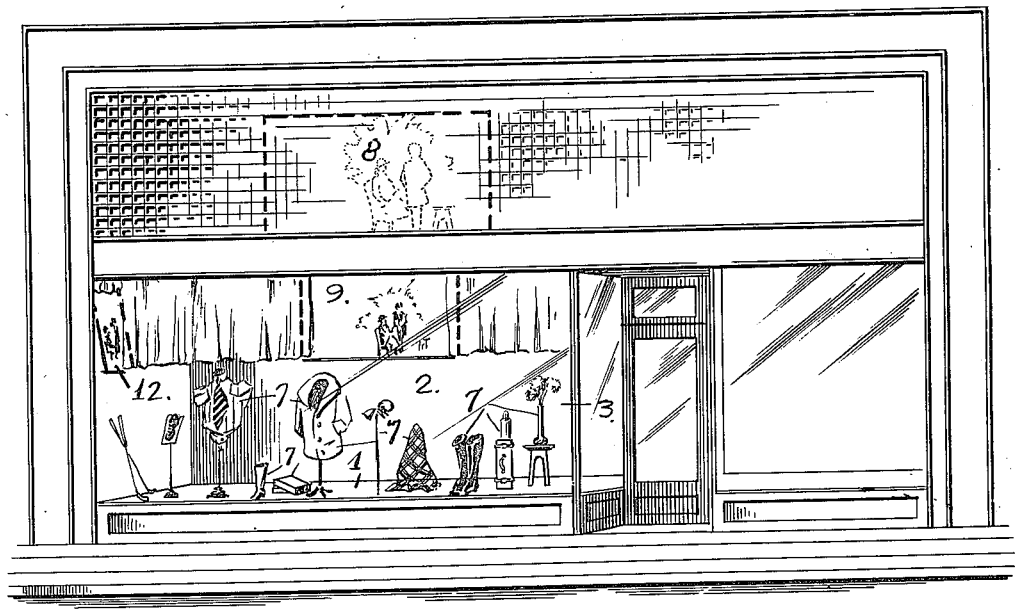
Fig. 2 is a front elevation of the display and miniature demonstration as viewed by the public.

Referring to the drawings the numeral 1 is used to designate the floor of a comparatively shallow display window and 2 the front glass or window thereof.

The display window is provided with the usual rear panels or what I term rear partition 3 from the top of which rearwardly extends a stage 4, such as a balcony or mezzanine floor which is generally invisible through or from the window 2.

An opaque partition or paneling 6 is placed in front of the stage 4 and in the same vertical plane with the window 2. This arrangement is usual in stores and the opaque partition may be constructed of refracting prisms to illuminate the stage 4 and is only opaque in so far as the view of the public through the window 2 is concerned.

The new or novel goods 7 are displayed in the display window by being placed on the floor 1 thereof. The demonstration of the articles or goods 7 takes place on the stage 4 as at 8.

A mirror or any other suitable reflecting element 9 is placed upon the rear partition 3 and slightly above the articles 7 so that a proper view of said reflecting element 9 may be had through the window 2.

A second reflecting element 11 is placed directly in line with the demonstration 8 on the stage 4 and also in line with the reflecting element 9 so that the demonstration of the appearance and utility of the goods or articles 7 within the window 2, as demonstrated by the actors at 8, will be reflected and thereby reproduced in miniature within the reflecting element 9, and adjacent to said goods or articles 7 being demonstrated.

A third reflecting element 12 is arranged at the proper angle to one side or end of the display window and in proper relation with a fourth reflecting element 14 which reflects the demonstration at 8 to the reflecting element 12 thereby rendering said demonstration visible from one side of the window, as for instance, from the position occupied by the figure or person 16 approaching the said display.

In Fig. 7 I have illustrated, diagrammatically, an arrangement whereby the reflecting elements 9 and 11 are arranged to reflect a demonstration taking place within the basement 17. This arrangement may be used where no balcony or mezzanine floor is available.

In Fig. 6 I have illustrated a further modification wherein the display is arranged upon the roof of a building or top of a high bill board or the like which would otherwise be invisible to the public below.

In Fig. 4 I have shown a frame member 27 adapted to carry a reflector of any suitable type and a standard 28 is secured as shown at 29 near the middle of the back of said frame. Pivotally connected thereto, as shown at 31 is a rod 32 rotatable in a standard base 33, secured to a suitable shelf or support.

The boss portion of the base 33 is provided with a set screw 36 for a securing rod 32. The rod 32 is provided with a slot 37 through which extends a quadrant 38. The rod 32 is also provided with a thumb screw 39 threaded to enter slot 37 and secure quadrant 38 in any desired position.

Figure 3:
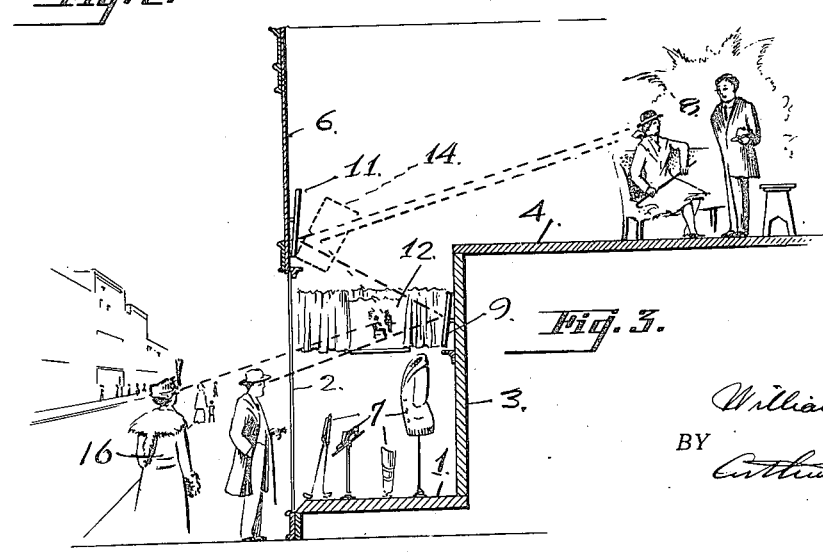
Fig. 3 is a vertical longitudinal sectional view taken through the front portion of a store disclosing the arrangement of the display, stage and reflecting elements.

My device is of a decided advantage to stores on busy and popular thoroughfares where first floor space is valuable and is required for business purposes. Another advantage of the device is that the arrangement shown in Figs. 3 and 6 may be combined by making the floor 1 of the window removable. In this manner a display may be arranged for demonstration in the basement without discontinuing the balcony demonstration. When the basement demonstration is ready the reflecting element 9 which may be mounted as disclosed in Figs. 4 and 5, is altered to reflect the demonstration from the lower reflecting element 11'.

It is evident from the foregoing that I have provided an improved device for producing a miniature reflection of a demonstration where such demonstration is taking place at a point remote from the observer and not normally visible to him, thereby effecting a saving in window space which may be required for the display of articles or goods being demonstrated.

Having thus described my invention what I claim as new and desire to secure by Letters Patent is—

1. The combination with a display window and rear partition therefor of a reflecting element arranged on and at an angle to said partition; and a second reflecting element arranged above the window to reflect a remote point onto the first reflecting element; and a reflecting element arranged on one side of and at an angle to the first reflecting element to reflect the reflection of the said reflecting element toward one end of the window.

2. The combination with a comparatively shallow display window of a rear partition to said window; a stage extending back from the top of said partition and of greater depth than said window; an opaque partition above the glass of the display window and in front of the stage; a reflecting element arranged near the upper portion of the window partition and above goods displayed within said window; and a second reflecting element arranged on the opaque partition above the display window to reflect images on the stage into the first mentioned reflecting element, whereby a miniature reproduction of an animated demonstration of goods on display within the display window may be depicted within the reflecting element on the display window partition and above said goods.

3. The combination with a comparatively shallow display window of a rear partition to said window; a stage extending back from the top of said partition and of greater depth than said window; an opaque partition above the glass of the display window and in front of the stage; a reflecting element arranged near the upper portion of the window partition and above goods displayed within said window; and a second reflecting element arranged on the opaque partition above the display window to reflect images on the stage into the first mentioned reflecting element, whereby a miniature reproduction of an animated demonstration of goods on display within the display window may be depicted within the reflecting element on the display window partition and above said goods; and a reflecting element arranged on each end of the display window to reflect from the second mentioned reflecting element, whereby a demonstration on the stage may be rendered visible from either end of said window.

4. The combination with a comparatively shallow display window of a rear partition therefor equal in height to the transparent portion of said window; a stage extending back from the top of the partition a distance greater than the depth of said window; an opaque partition extending above the glass of the display window and in substantially the same plane therewith; a reflecting element arranged on the rear partition; and above goods on display within said window; a second reflecting element arranged on the partition in front of the stage to reflect an animated demonstration of goods on said stage into the reflecting element within the window thereby producing a demonstration of the utility and appearance of goods on display within the window directly above said goods.

In witness whereof I hereunto set my signature.

WILLIAM H. SLITER.